(12) United States Patent
Schnaitter (10) Patent No.: US 7,212,064 B1
(45) Date of Patent: May 1, 2007

(54) METHODS AND SYSTEMS FOR MEASURING TEMPERATURE USING DIGITAL SIGNALS

(75) Inventor: William N. Schnaitter, San Ramon, CA (US)

(73) Assignee: Transmeta Corporation, Santa Clara, CA (US)

( * ) Notice: Subject to any disclaimer, the term of this patent is extended or adjusted under 35 U.S.C. 154(b) by 58 days.

(21) Appl. No.: 11/056,549

(22) Filed: Feb. 11, 2005

(51) Int. Cl.
*H01L 35/00* (2006.01)
(52) U.S. Cl. .................................................. 327/512
(58) Field of Classification Search ........ 327/512–513, 327/63, 67–70
See application file for complete search history.

(56) References Cited

U.S. PATENT DOCUMENTS

| | | | |
|---|---|---|---|
| 6,087,866 A * | 7/2000 | Prucklmayer ............... | 327/143 |
| 6,809,968 B2 * | 10/2004 | Marr et al. ............. | 365/185.24 |
| 6,888,397 B2 * | 5/2005 | Tsuchiya .................... | 327/512 |
| 6,975,047 B2 * | 12/2005 | Pippin ........................ | 307/117 |
| 7,009,904 B2 * | 3/2006 | Kim ........................... | 365/211 |
| 7,108,420 B1 * | 9/2006 | Schnaitter ................... | 374/168 |

* cited by examiner

*Primary Examiner*—My-Trang Nu Ton (57) ABSTRACT

Methods and systems for measuring temperature are described. A voltage source supplies a voltage. A current source supplies an amount of current that is controlled using a digital input signal. A diode is coupled to the current source. A comparator has a first input coupled to the voltage source and a second input coupled to a node between the current source and the diode. The digital input signal is changed to a value that causes an output of the comparator to change state. A value of the digital input signal is determined for each of two voltages. The values of the digital input signal and the two voltage values (or the difference between the two voltages) are used as inputs to a temperature calculation.

23 Claims, 5 Drawing Sheets

METHODS AND SYSTEMS FOR MEASURING TEMPERATURE USING DIGITAL SIGNALS

BACKGROUND OF THE INVENTION

1. Field of the Invention

Embodiments of the present invention relate to the operation of semiconductor devices.

2. Related Art

The relationship between the current (I) of a p-n junction and junction temperature is described by the Diode Equation:

$$I=I_s*[\exp(qV/nkT)-1], \quad (1)$$

where $I_s$ is the saturation current, q is the electron charge, V is the p-n junction voltage, n is the ideality factor, k is Boltzmann's constant, and T is the absolute temperature (Kelvin). Sequential measurements of current and voltage can be performed to obtain two data pairs (I1, V1) and (I2, V2). The temperature T is then calculated from the Diode Equation as follows (the "−1" term can be neglected):

$$T=(q/nk)*(V2-V1)/(ln(I2/I1)). \quad (2)$$

Accurate measurements of temperature are used, for example, to make sure that an integrated circuit is operating within its limits. However, the errors associated with voltage and current measurements can introduce errors into the temperature calculation.

SUMMARY OF THE INVENTION

Methods and/or systems for accurately measuring temperature in, for example, an integrated circuit would be advantageous. Embodiments in accordance with the present invention provide this and other advantages.

According to one embodiment of the present invention, a voltage source supplies a voltage. A current source supplies an amount of current that is controlled using a digital input signal. A diode is coupled to the current source. A comparator has a first input coupled to the voltage source and a second input coupled to a node between the current source and the diode. The digital input signal is changed to a value that causes an output of the comparator to change state. A value of the digital input signal is determined for each of two voltages. The values of the digital input signal and the two voltage values (or the difference between the two voltages) are used as inputs to a temperature calculation.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "determining" or the like, refer to the action and processes (e.g., flowchart 50 of FIG. 5) of a computer system or similar intelligent electronic computing device (generally, a controller), that manipulates and transforms data represented as physical (electronic) quantities within the computer system's registers and memories into other data similarly represented as physical quantities within the computer system memories or registers or other such information storage, transmission or display devices.

Figure 1:
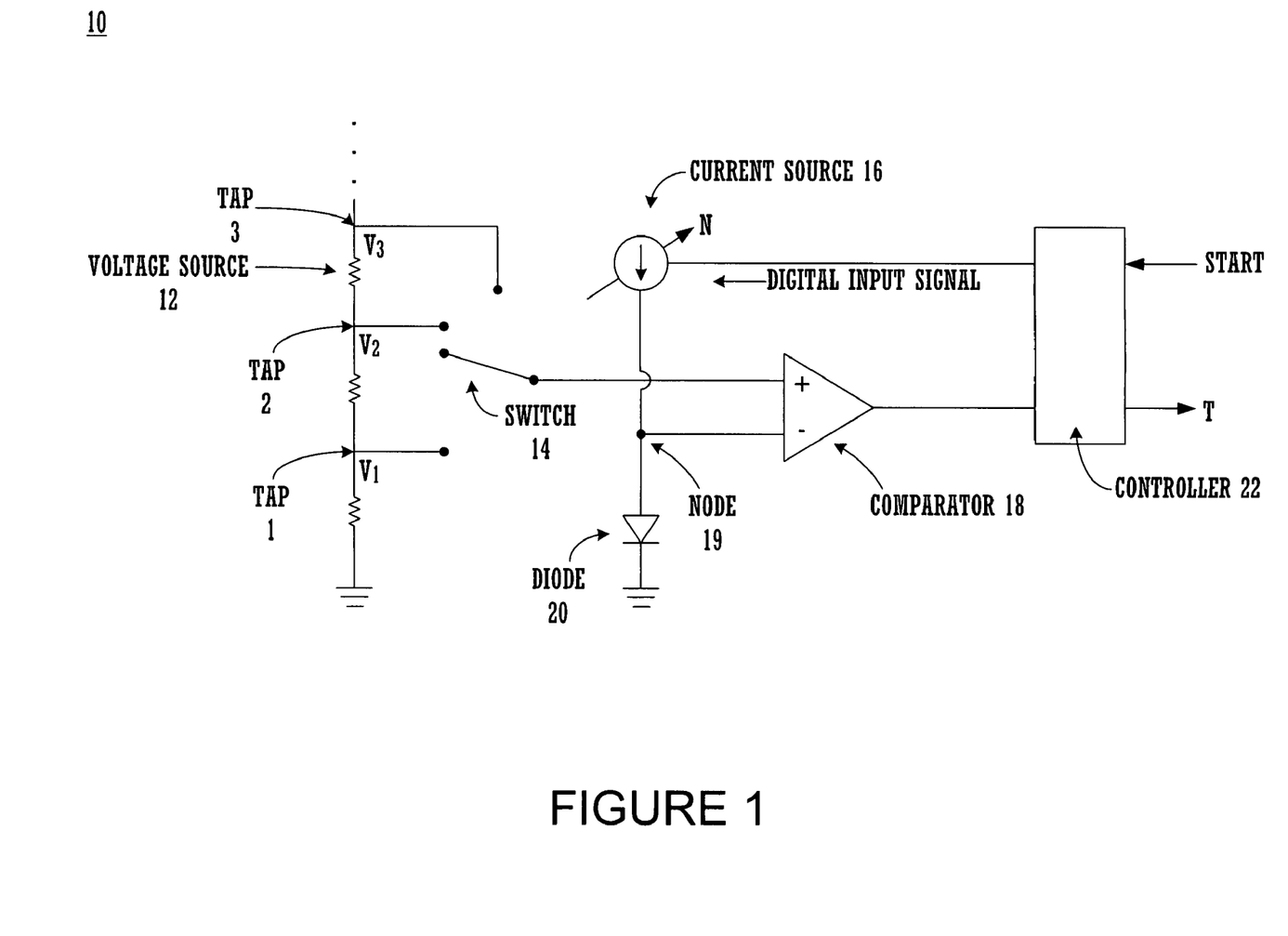
FIG. 1 is a diagram of a system for measuring temperature according to one embodiment of the present invention.

FIG. 1 is a diagram of a system 10 for measuring temperature according to one embodiment of the present invention. In the example of FIG. 1, system 10 includes a voltage source 12, a current source 16, a comparator 18 and a diode 20.

In one embodiment, voltage source 12 is a bandgap (e.g., silicon bandgap) reference circuit. In general, voltage source 12 is a precision circuit that supplies one or more voltages that are substantially insensitive to the circuit's supply voltage and operating temperature.

In one embodiment, voltage source 12 includes multiple taps (e.g., taps 1, 2 and 3). Tap 1 supplies a voltage V1, tap 2 supplies a voltage V2 (different from V1), and tap 3 supplies a voltage V3 (different from V1 and V2). Alternatively, multiple voltage sources can be used.

As will be seen, two voltage values will be used to determine a temperature using the Diode Equation, which depends on the difference between the two voltages. Accordingly, more than two voltages (e.g., V1 and V2) may not be necessary; the third voltage (e.g., V3) can be used for error correction if available. In addition, it is not necessary that the values of V1 and V2 be known; the difference between the values V1 and V2 may be known even if the values V1 and V2 are not known. Also, the accuracy of the temperature calculation is in part a function of the accuracy to which the two voltage values (or the difference between those two values) is known; the accuracy to which the two voltage values (or the difference between those two values) is known is thus a design decision that depends on the desired degree of accuracy in the temperature calculation.

In one embodiment, current source 16 is a digitally programmable current source that is controlled using a digital signal. In one such embodiment, current source 16 includes a number of well-matched small current source elements. The amount of current supplied by current source 16 is a function of the number of current source elements that are turned on by the digital signal. In general, current source 16 is a variable current source that supplies an amount of current that is proportional to the value of a digital input signal.

In one embodiment, the digital input signal is an eight-bit ($b_1, b_2, \ldots, b_8$) signal, with each bit turning on (or off) some number of current source elements. For example, the most significant bit ($b_1$) can control (turn on or off) one current source element, the second most significant bit ($b_2$) can control two current source elements, the third most significant bit ($b_3$) can control four current source elements, and so on. Thus, under control of an eight-bit input signal, current source 16 can provide up to 256 levels of current. However, signals longer or shorter than eight bits may be used. Also, the manner in which a digital input signal controls which current source elements are turned on or off may be different than that just described.

In one embodiment, the current source elements that may be switched on at a particular time are selected in centroidal (or symmetrical) fashion. For example, if four current source elements are to be turned on, two current source elements to one side of a center point and two current source elements to the other side of the center point are selected, each pair generally at equal distances from the center point.

In one embodiment, the anode of a diode 20 (e.g., a p-n junction diode) is connected to the current source 16, with the cathode of the diode 20 connected to ground. In one embodiment, a comparator 18 (e.g., a differential comparator) is connected to the current source 16 and the voltage supply 12. More specifically, in such an embodiment, one input of the comparator 18 is connected to a node 19 between the current source 16 and the anode of the diode 20. The other input of the comparator 18 is connected to the voltage source 12. In one embodiment, a switch 14 is positioned between the comparator 18 and the voltage source 12, allowing the input to the comparator 18 to be switched between tap 1 (voltage V1) and tap 2 (voltage V2).

In one embodiment, system 10 also includes a controller 22 that supplies the aforementioned digital input signal to current source 16 and that is also coupled to the output of comparator 18. Controller 22 can also manage other aspects of system 10; for example, controller 22 can control the position of switch 14. In one embodiment, controller 22 also has knowledge of the values of V1, V2 and V3 (or the differences between those values) as well as other information used to compute a temperature (T) at the diode 20 using a derivation of the Diode Equation that is described further below.

System 10 can be incorporated into an integrated circuit or some other type of semiconductor device in order to determine a temperature for that circuit/device. More specifically, the temperature is determined at diode 20. The temperature at diode 20 is considered to be representative of the temperature of the circuit or device incorporating the system 10.

System 10 can be used as follows to measure temperature. Switch 14 is set so that tap 1 (voltage V1) is connected to one of the inputs of comparator 18. A digital input signal is supplied to current source 16. The digital input signal is varied so that the amount of current generated by current source 16 is varied (increased or decreased) until the output of comparator 18 is caused to switch (change state). The value of the digital input signal (e.g., a value N1) at the time the output of comparator 18 changes state is recorded by controller 22.

Switch 14 is then set so that tap 2 (voltage V2) is connected to one of the inputs of comparator 18. The inputs of comparator 18 may be the gate electrodes of metal-oxide semiconductor (MOS) thick-oxide transistors so that there is no current (or an insignificant amount of current) going to comparator 18 from the current source 16. The digital input signal is again varied to increase or decrease the amount of current generated by current source 16 until the output of comparator 18 is again caused to change state. The value of the digital input signal (e.g., a value N2) at the time the output of comparator 18 changes state again is also recorded by controller 22.

As previously described herein, the junction temperature of diode 20 can be determined as follows:

$$T=(q/nk)*(V2-V1)/(\ln(I2/I1)), \qquad (2)$$

where $I_s$ is the saturation current, q is the electron charge, V is the p-n junction voltage, n is the ideality factor, k is Boltzmann's constant, and T is the absolute temperature (Kelvin). According to embodiments of the present invention, the currents I1 and I2 are proportional to the first and second values of the digital input signal (N1 and N2, respectively). Thus, the junction temperature of diode 20 can be determined as follows:

$$T=(q/nk)*(V2-V1)/(\ln(N2/N1)). \qquad (3)$$

In one embodiment, the midpoints of the intervals in which the comparator 18 changed state are used in equation (3). For example, if at voltage V1 the comparator 18 changed state when N1 is changed from 178 to 179 (actually, the digital signal equivalents of 178 and 179), then a value equivalent to 178.5 is used in equation (3).

The amount of voltage supplied by voltage source 12 is within the voltage range that results in the ideality factor (n) of the Diode Equation being nearly equal to one. Similarly, the amount of current supplied by current source 16 is within the current range that results in the ideality factor of the Diode Equation being nearly equal to one. In one embodiment, a value of n=1.008 is used.

As mentioned above, error correction can be accomplished by repeating the above process using a third voltage (e.g., voltage V3) to obtain a third value of the digital input signal.

An advantage of system 10 is that the values of N1 and N2 are readily determined and are known to a high degree of granularity (that is, for an eight-bit signal, there are 256 levels of granularity). Another advantage is that a servo-loop is not needed to control the amount of current supplied by current source 16. Furthermore, it is not necessary to measure the currents supplied by current source 16. In an embodiment in which the voltage difference is input to the Diode Equation (instead of inputting two voltage values to determine the difference), it is also not necessary to measure the voltages supplied by voltage source 12. Also, relative to some conventional temperature measurement systems, system 10 consumes less surface area.

In addition, the quantization error (the uncertainty of the value N of the digital input signal that controls current source 16) is in the logarithm of equation (3). Thus, for example, the contribution of quantization error to the uncertainty in the temperature calculation is $1-(\ln N)/(\ln (N+1))$ instead of $1/N$. This means that, according to the present invention, the resulting uncertainty in temperature is smaller for any given number of bits in the digital input signal.

Figure 2:
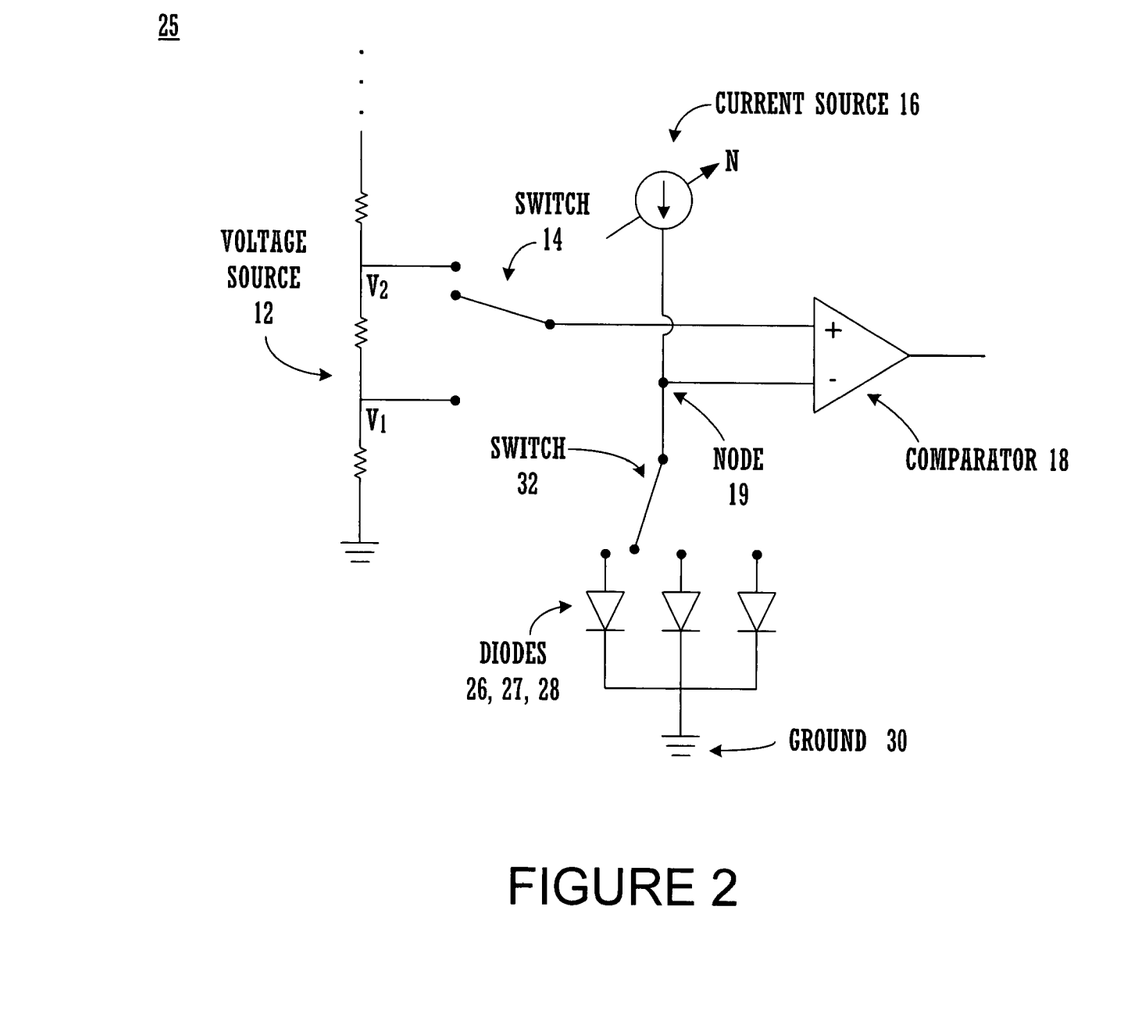
FIG. 2 is a diagram of a system for measuring temperature according to a second embodiment of the present invention.

FIG. 2 is a diagram of a system 20 for measuring temperature according to one embodiment of the present invention. System 20 includes a voltage source 12, a switch 14, a current source 16, a comparator 18 and a node 19, previously described herein. Although not illustrated, system 20 can also include a controller that performs functions similar to those described for controller 22 of FIG. 1.

In the example of FIG. 2, system 20 includes a number of diodes 26, 27 and 28 that are connectable to node 19, and hence to current source 16 and comparator 18, by switch 32. Three diodes are illustrated; however, the present invention is not so limited. In one embodiment, the diodes 26, 27 and 28 are connected to a common ground 30.

System 20 can be used to measure temperature in a manner similar to that described above for system 10, with temperature being determined in turn at each of the diodes 26, 27 and 28. For example, a process such as that described in conjunction with FIG. 1 can be used to determine values for N1 and N2 at voltages V1 and V2, respectively, for diode 26, then for diode 27, and so on. Alternatively, a value for N1 can be determined at voltage V1 for each of the diodes, and then a value for N2 can be determined at voltage V2 for each of the diodes. System 20 is advantageous in that the diodes 26, 27 and 28 can be positioned in different locations on an integrated circuit or other such device, so that temperatures can be measured throughout the circuit/device instead of at a single location.

Figure 3:
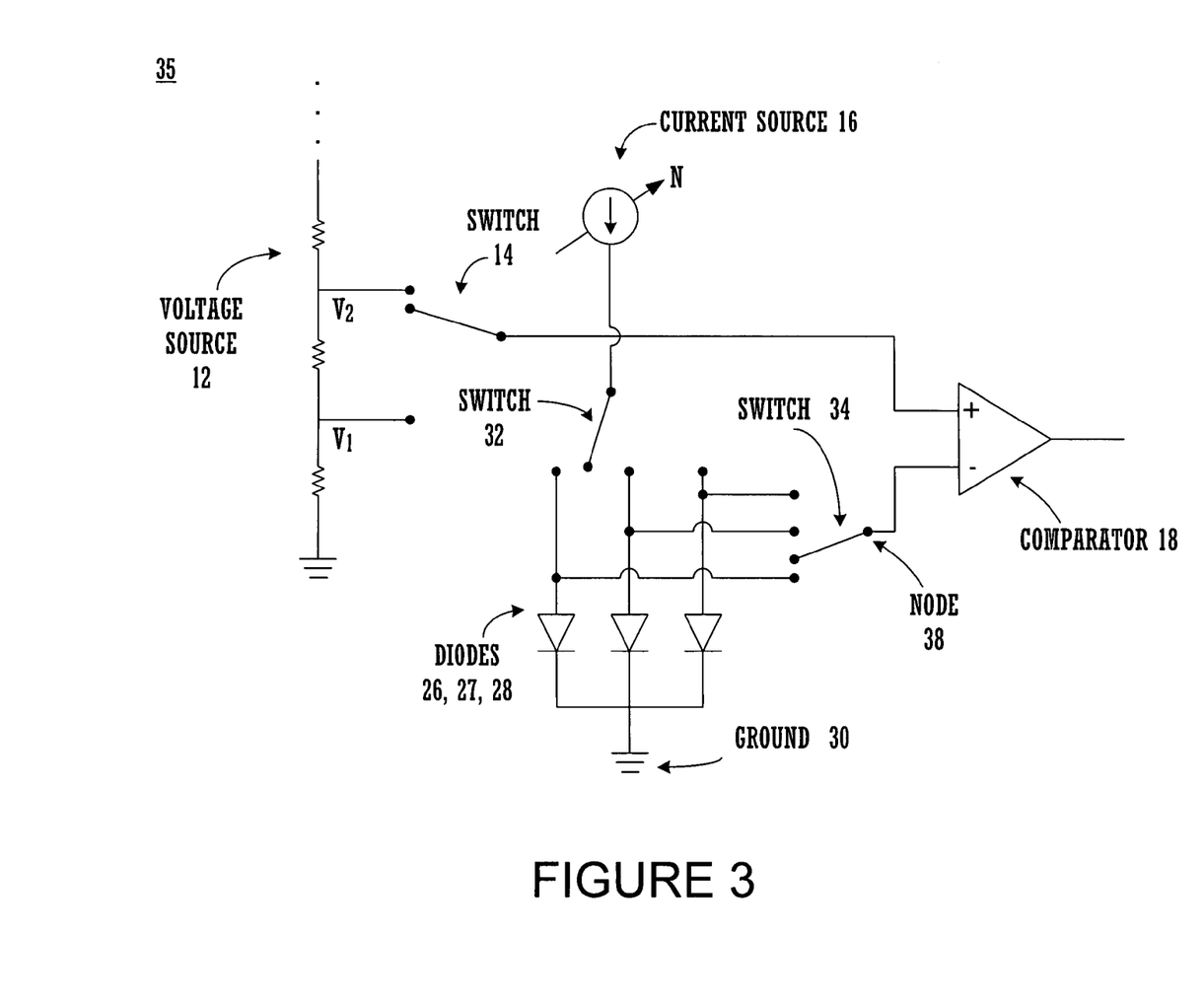
FIG. 3 is a diagram of a system for measuring temperature according to a third embodiment of the present invention.

FIG. 3 is a diagram of a system 35 for measuring temperature according to one embodiment of the present invention. System 35 includes a voltage source 12, a switch 14, a current source 16, a comparator 18, diodes 26, 27 and 28, and a switch 32, previously described herein. Although not illustrated, system 35 can also include a controller that performs functions similar to those described for controller 22 of FIG. 1.

In the example of FIG. 3, diodes 26, 27 and 28 are connectable to node 38, and hence to comparator 18, by switch 34. Three diodes are illustrated; however, the present invention is not so limited. Switches 32 and 34 are ganged so that when, for example, switch 32 is connected to diode 26, switch 34 is also connected to diode 26. An advantage of such an arrangement is that a small voltage across switch 32 (which carries a small current through switch 32) does not contribute any error to the determination of temperature (switch 34 carries negligible current).

Figure 4:
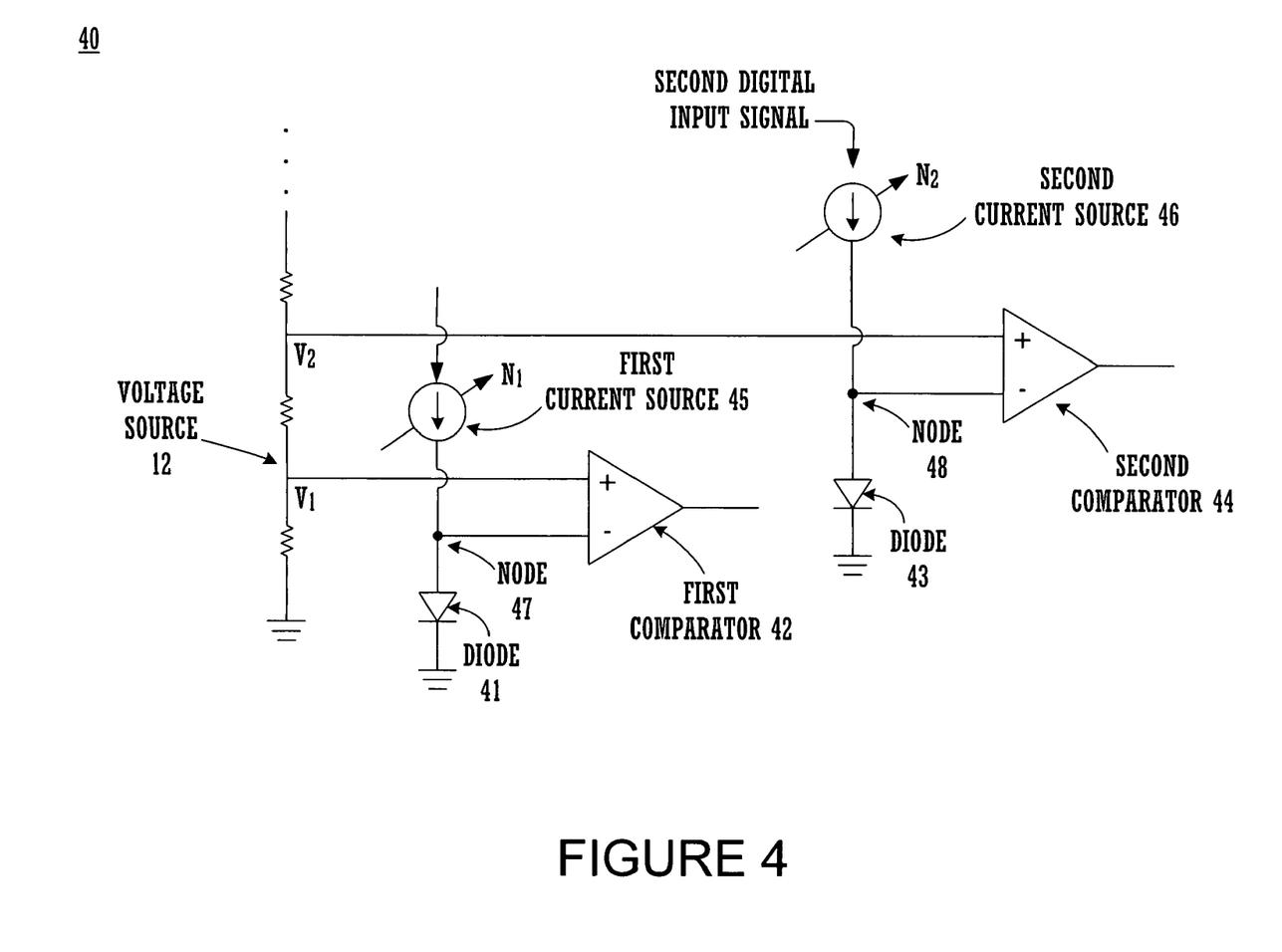
FIG. 4 is a diagram of a system for measuring temperature according to a fourth embodiment of the present invention.

Elements of systems 10, 20 and 35 can be duplicated on an integrated circuit or other such device, so that multiple temperature measurements can be made in parallel (e.g., at the same time). FIG. 4 is a diagram of a system 40 for determining values for two pairs of V and N (two voltage-signal value pairs) at the same time according to one embodiment of the present invention. Although described for two measurements, the present invention is not so limited.

System 40 includes a voltage source 12, as previously described herein. In the example of FIG. 4, system 40 includes a first current source 45 and a second current source 46 coupled to a diode 41 and a diode 43, respectively. In one embodiment, the diodes 41 and 43 are co-located and centroided. An advantage of such an arrangement is, because two voltage-signal value pairs are determined essentially at the same time, temperature determinations can be made more quickly. This is particularly advantageous in situations in which temperature changes rapidly.

Another advantage of system 40 is that the diodes 41 and 43 can be different sizes. One diode can be selected for a first range of currents and the other diode for a second range of currents, smaller than and perhaps encompassed by the first range. Accordingly, the difference between adjacent current values in the first range will be greater than the difference in the second range. That is, as mentioned above, the amount of current is proportional to the value of a digital input signal; in essence, the amount of current is increased or decreased in steps, where the size of the steps depends on the range of the current source. The use of different sizes of diodes can be used to reduce quantization errors associated with the size of the steps.

In one embodiment, current sources 45 and 46 are digitally programmable current sources that are controlled by a respective digital signal (a first digital input signal and a second digital input signal) in a manner similar to that described for current source 16 (FIG. 1). In one embodiment, system 40 also includes a controller (not shown) that supplies the first and second digital input signals to current source 45 and 46, respectively. The controller can also be connected to the outputs of the comparators 42 and 44.

In one embodiment, the anode of a diode 41 is connected to the first current source 45, with the cathode of the diode 41 connected to ground. In one embodiment, a first comparator 42 is connected to the first current source 45 and the voltage supply 12. More specifically, in such an embodiment, one input of the first comparator 42 is connected to a node 47 between the first current source 45 and the anode of the diode 41. The other input of the first comparator 42 is connected to tap 1 (voltage V1) of the voltage source 12.

Also, in the present embodiment, the anode of a diode 43 is connected to the second current source 46, with the cathode of the diode 43 connected to ground. In one embodiment, a second comparator 44 is connected to the second current source 46 and the voltage supply 12. More specifically, in such an embodiment, one input of the second comparator 44 is connected to a node 48 between the second current source 46 and the anode of the diode 43. The other input of the second comparator 44 is connected to tap 2 (voltage V2) of the voltage source 12.

System 40 can be used as follows to measure temperature. A first digital input signal is supplied to the first current source 45. The first digital input signal is varied so that the amount of current generated by the first current source 45 is varied (increased or decreased) until the output of the first comparator 42 is caused to change state. The value of the first digital input signal (e.g., a value N1) at the time the output of comparator 42 changes state is recorded. A second digital input signal is supplied to the second current source 46. The second digital input signal is varied so that the amount of current generated by the second current source 46 is varied (increased or decreased) until the output of the second comparator 44 is caused to change state. The value of the second digital input signal (e.g., a value N2) at the time the output of comparator 44 changes state is also recorded. Equation (3) is then applied as described above.

The features of system 40 can be combined with the features of systems 20 and 35 of FIGS. 2 and 3, respectively. That is, for example, multiple diodes can be used in system 40 in place of the single diodes 41 and 43.

Figure 5:
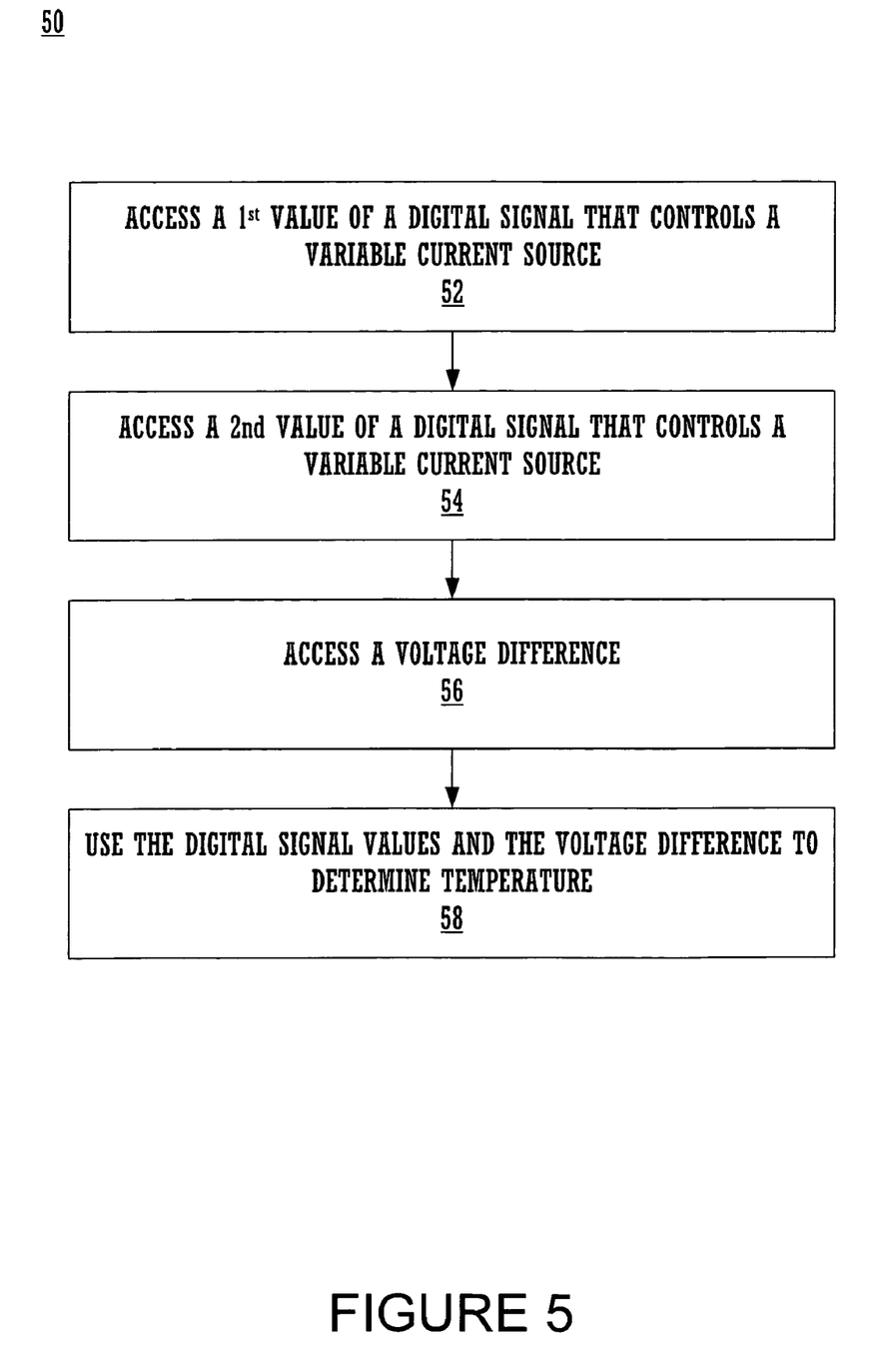
FIG. 5 is a flowchart of a method for measuring temperature in accordance with one embodiment of the present invention.

FIG. 5 is a flowchart 50 of a method for measuring temperature in accordance with one embodiment of the present invention. Although specific steps are disclosed in flowchart 50, such steps are exemplary. That is, embodiments of the present invention are well-suited to performing various other steps or variations of the steps recited in flowchart 50. It is appreciated that the steps in flowchart 50 may be performed in an order different than presented, and that not all of the steps in flowchart 50 may be performed. Some or all of the processes and steps of flowchart 50 can be realized, in one embodiment, as a series of instructions that reside in hardware or software and are executed by controller 22 of FIG. 1.

In step 52 of FIG. 5, in one embodiment, a first value of a digital signal that controls the amount of current supplied by a variable current source is accessed. The first value of the digital signal corresponds to a first amount of current that in turn corresponds to a first amount of voltage measured at one input of a comparator. The first amount of voltage in turn is substantially equal to a second amount of voltage (voltage V1 of FIGS. 1–4) that is supplied by a voltage source. The voltage source can also supply a third amount of voltage (voltage V2 of FIGS. 1–4).

In step 54, in one embodiment, a second value of a digital signal that controls the amount of current supplied by a variable current source is accessed. The second value of the digital signal corresponds to a second amount of current that in turn corresponds to a fourth amount of voltage measured at one input of a comparator. The fourth amount of voltage in turn is substantially equal to the third amount of voltage that is supplied by a voltage source.

The variable current sources of steps 52 and 54 may be the same current source (e.g., current source 16 of FIGS. 1–3), and the comparators of steps 52 and 54 may be the same comparator (e.g., comparator 18 of FIGS. 1–3). Accordingly, the first and second values of the digital signal are two values of the same digital signal used to control the current source 16.

Alternatively, the variable current sources of steps 52 and 54 may be different current sources (e.g., current sources 45 and 46 of FIG. 4). Accordingly, the first value of the digital signal is associated with one digital signal used for controlling one of the current sources, and the second value of the digital signal is associated with a second digital signal used for controlling the other of the current sources. Also, the comparators of steps 52 and 54 may be different comparators (e.g., comparators 42 and 44 of FIG. 4).

In step 56 of FIG. 5, a voltage difference between two voltages (specifically, the second voltage and the third voltage of steps 52 and 54) is accessed. The voltage difference may be determined by calculating the difference between two known voltage values.

In step 58, the voltage difference and the first and second digital signal values are used to determine a temperature using equation (3).

Embodiments in accordance with the present invention are thus described. While the present invention has been described in particular embodiments, it should be appreciated that the present invention should not be construed as limited by such embodiments, but rather construed according to the below claims.

What is claimed is:

1. A system for determining temperature, said system comprising:
 a variable first current source controlled using a first digital signal;
 a first diode coupled to said first current source;
 a voltage source adapted to supply a first voltage and a second voltage; and
 a first comparator coupled to said first current source and to said voltage source, said first comparator having an output that changes state as a result of comparing said first voltage and a third voltage that corresponds to a first amount of current supplied by said first current source, wherein said temperature is determined using the difference between values of said first and second voltages and also using a first digital value and a second digital value, wherein one of said first and second digital values corresponds to a first value of said first digital signal when said output of said first comparator changes state.

2. The system of claim 1 further comprising a switch that switches said first comparator between said first voltage and said second voltage.

3. The system of claim 2 wherein the other of said first and second digital values corresponds to a second value of said first digital signal when said output of said first comparator changes state a second time as a result of comparing said second voltage and a fourth voltage that corresponds to a second amount of current supplied by said first current source.

4. The system of claim 1 wherein said voltage source comprises a voltage divider with a first tap for supplying said first voltage and a second tap for supplying said second voltage.

5. The system of claim 4 further comprising:
 a variable second current source controlled using a second digital signal;
 a second diode coupled to said second current source; and
 a second comparator coupled to said voltage source and to said second current source, wherein said first tap is coupled to said first comparator and said second tap is coupled to said second comparator, said second comparator having an output that changes state as a result of comparing said second voltage and a fourth voltage that corresponds to an amount of current supplied by said second current source, wherein the other of said first and second digital values corresponds to a value of said second digital signal when said output of said second comparator changes state.

6. The system of claim 1 wherein said first current source comprises a plurality of current source elements, wherein a number of said current source elements are turned on according to said first digital signal.

7. The system of claim 1 further comprising:
a second diode coupled to said first current source; and
a first switch between said first current source and said first and second diodes.

8. The system of claim 7 further comprising a second switch between said first and second diodes and said first comparator.

9. The system of claim 1 further comprising a controller coupled to said first comparator and said first current source.

10. A system for measuring temperature, said system comprising:
a first comparator having a first input and a second input;
a voltage source that supplies a first voltage to said first input of said comparator;
a first current source that supplies an amount of current, said amount controlled using a first digital input signal; and
a first diode coupled to said first current source, wherein said second input of said comparator is coupled to a node between said first current source and said first diode, wherein said first digital input signal is changed to a first value that causes an output of said first comparator to change state, said first voltage and said first value of said first digital input signal comprising a first voltage-signal value pair used as input to a temperature calculation, said temperature calculation also using a second voltage-signal value pair.

11. The system of claim 10 wherein said voltage source comprises a voltage divider with a first tap for supplying said first voltage and a second tap for supplying a second voltage.

12. The system of claim 11 further comprising a switch between said first input of said first comparator and said first and second taps, wherein said first input is switched from said first voltage to said second voltage and wherein said first digital input signal is changed to a second value that causes said output of said first comparator to change state a second time, said second voltage and said second value of said first digital input signal comprising said second voltage-signal value pair.

13. The system of claim 11 further comprising:
a second current source that supplies an amount of current, said amount controlled using a second digital input signal;
a second diode coupled to said second current source; and
a second comparator coupled to said voltage source and to said second current source and second diode, wherein said first tap is coupled to said first comparator and said second tap is coupled to said second comparator, said second digital input signal changed to a value that causes an output of said second comparator to change state, wherein said second voltage and said value of said second digital input signal comprise said second voltage-signal value pair.

14. The system of claim 10 wherein said first current source comprises a plurality of current source elements, wherein a number of said current source elements are turned on depending on the value of said first digital input signal.

15. The system of claim 10 further comprising:
a second diode coupled to said first current source; and
a switch between said first current source and said first and second diodes.

16. The system of claim 10 further comprising:
a second diode coupled to said first current source;
a first switch between said first current source and said first and second diodes; and
a second switch between said first and second diodes and said comparator.

17. The system of claim 10 further comprising a controller coupled to said first comparator and said first current source.

18. A method of measuring temperature, said method comprising:
accessing a first value of a first digital signal that controls a variable first current source, wherein said first value corresponds to a first amount of current that corresponds to a first voltage, and wherein further said first voltage is substantially equal to a second voltage supplied by a voltage source; and
determining said temperature using inputs comprising said first value of said first digital signal, a second digital value used for controlling a current source, and a voltage difference between said second voltage and a third voltage supplied by said voltage source.

19. The method of claim 18 wherein said voltage source comprises a voltage divider with a first tap for supplying said second voltage and a second tap for supplying said third voltage.

20. The method of claim 19 further comprising:
using a second value of said first digital signal as said second digital value, wherein said second value of said first digital signal corresponds to a second amount of current that corresponds to a fourth voltage, and wherein further said fourth voltage is substantially equal to said third voltage; and
determining said temperature using inputs further comprising said second value of said first digital signal.

21. The method of claim 19 further comprising:
using a value of a second digital signal that controls a variable second current source as said second digital value, wherein said value of said second digital signal corresponds to a second amount of current that corresponds to a fourth voltage, and wherein further said fourth voltage is substantially equal to said third voltage; and
determining said temperature using inputs further comprising said value of said second digital signal.

22. The method of claim 21 wherein said second current source comprises a plurality of current source elements, wherein a number of said current source elements are turned on according to said second digital signal.

23. The method of claim 18 wherein said first current source comprises a plurality of current source elements, wherein a number of said current source elements are turned on according to said first digital signal.

* * * * *